United States Patent [19]

Sato et al.

[11] 4,442,171

[45] Apr. 10, 1984

[54] MAGNETIC RECORDING MEDIUM

[75] Inventors: Masami Sato; Goro Akashi; Yasutoshi Okuzawa; Toshimitu Okutu, all of Odawara, Japan

[73] Assignee: Fuji Photo Film Co., Ltd., Kanagawa, Japan

[21] Appl. No.: 356,285

[22] Filed: Mar. 9, 1982

[30] Foreign Application Priority Data

Mar. 12, 1981 [JP] Japan .................. 56-35833

[51] Int. Cl.³ .............................................. G11B 5/70
[52] U.S. Cl. .................. 428/336; 252/62.54; 360/134; 360/135; 360/136; 427/128; 428/161; 428/332; 428/694; 428/695; 428/900
[58] Field of Search ............... 428/161, 409, 694, 695, 428/900, 336, 332; 252/62.54; 360/134–136; 427/128

[56] References Cited

U.S. PATENT DOCUMENTS

| | | | |
|---|---|---|---|
| 3,515,569 | 6/1970 | Walters et al. | 428/161 |
| 4,071,654 | 1/1978 | Ogama et al. | 428/336 |
| 4,135,032 | 1/1979 | Akashi | 428/328 |
| 4,153,920 | 5/1979 | Shirahata | 428/409 |
| 4,175,145 | 11/1979 | Fechter | 428/409 |
| 4,318,957 | 3/1952 | Videc | 428/694 |
| 4,328,935 | 5/1982 | Steel | 428/694 |

Primary Examiner—Ellis P. Robinson
Attorney, Agent, or Firm—Pasquale A. Razzano

[57] ABSTRACT

A magnetic recording medium comprising a nonmagnetic flexible substrate, a magnetic layer provided on the surface of the substrate and containing ferromagnetic grains dispersed in a binder, and a back layer provided on the back surface of the substrate. The magnetic recording medium has a stiffness ($S_{TD}$) of 6.0 or less. The friction coefficient ($\mu_B$) of the back layer surface with respect to the axial direction of a loading post in a video tape recorder is controlled to satisfy the condition:

$$0 \leq \mu_B \leq 0.1 S_{TD} - 0.05$$

so as to make the magnetic recording medium highly resistant to damage due to movement in a video tape recorder.

6 Claims, 5 Drawing Figures

MAGNETIC RECORDING MEDIUM

BACKGROUND OF THE INVENTION

1. Field of the Invention

This invention relates to a magnetic recording medium, and more particularly to a magnetic recording medium which exhibits excellent surface smoothness and low noise characteristics and which is extremely resistant to damage when it is moved in a video tape recorder for long-term in recording in the form of a thin magnetic tape.

2. Description of the Prior Art

In order to increase the information recording capacity of a magnetic tape for use in a video tape recorder, it is generally desired to minimize the thickness of the magnetic tape since the tape roll diameter in a video tape recorder is limited to a certain value. However, a magnetic tape of a reduced thickness presents a very real problem with regard to mechanical strength. Namely, if the tape thickness is reduced, the magnetic tape becomes limp and is readily stretched and damaged when it is moved in a video tape recorder.

Further, a video tape should have a small coefficient of friction to facilitate its movement over the fixed magnetic head, drum, guide pole and other components in a video tape recorder. A video tape having a large coefficient of friction suffers from a large movement tension and tends to be damaged in a video tape recorder. By tape damage is meant the elongation, deformation and edge folding of the magnetic tape which occur when the magnetic tape is used for recording and reproduction in a video tape recorder. Although tape damage occurs during normal movement of the magnetic tape, it occurs even more readily during loading and unloading thereof. This is because the magnetic tape receives a larger tension during loading and unloading than during normal movement. The magnetic tape is more readily damaged in the VHS system video tape recorder than in the $\beta$-format system video tape recorder. As an example of a VHS system video tape recorder in which folding of the tape edges occurs readily there can be mentioned one in which the loading post is made of an acetal copolymer and in which the winding-up torque at the time of unloading is about 300 g-cm or more, as in the case of the Victor HR3600 (available from Victor Company of Japan, Limited), the MACLORD NV-8300 (available from Matsushita Electric Industrial Co., Ltd., in Japan), or the like. Folding of the tape edges occurs at a loading post 1 on the supply side as shown in FIG. 1 because of deterimental shifting of the magnetic tape along the loading posts 1 and 2. In this case, the surface (non-magnetic layer surface) of the tape opposite to the magnetic layer surface thereof is in contact with the loading posts.

The aforesaid tape damage causes skew, jitter and voice deterioration, and the tape edge folding seriously affects the magnetic recording and reproduction. Thus, a need exists for a magnetic recording tape which is highly resistant to the tape damage as described above.

SUMMARY OF THE INVENTION

The primary object of the present invention is to provide a magnetic recording medium suitable for long-term high-density recording.

Another object of the present invention is to provide a magnetic recording medium having a non-magnetic layer surface of a low surface roughness, and exhibiting improved electromagnetic characteristics, particularly an improved level of signal-to-noise ratio (herein after referred to as S/N ratio).

The specific object of the present invention is to provide a magnetic recording medium which is thin in thickness and yet highly resistant to tape damage due to operations in a video tape recorder.

Studies made by the inventors to accomplish the above objects revealed that a thin magnetic recording tape having a thickness of 15.5 $\mu$m or less exhibits extremely high resistance to damage when the friction coefficient $\mu_B$ of the non-magnetic layer surface in the width direction with respect to the axial direction of the loading post and the stiffness $S_{TD}$ of the magnetic recording tape in the width direction are within the range where the friction coefficient $\mu_B$ is not larger than the values represented by the following formula and, in addition, the stiffness $S_{TD}$ is not lower than the values represented by the following formula (i.e. the range hatched in FIG. 2):

$$\mu_B = 0.1 \, S_{TD} - 0.05$$

where $S_{TD} \leq 6.0$.

The friction coefficient $\mu_B$ is preferably within the range of $\mu_B \leq 0.30$.

The value $\mu_B$ designates the coefficient of friction measured by bringing a $\frac{1}{2}$ inch wide magnetic tape into contact with a loading post at a touching angle within the range of 190° to 195° and pulling it with a load of 200 g at a tape moving speed of 0.5 mm/sec., an ambient temperature of 25° C. and relative humidity of 65% RH. The friction coefficient $\mu_B$ is calculated by the formula: $\mu_B = F/W$ where F designates the tensile stress and W the load. A method of measuring the friction coefficient $\mu_B$ is schematically shown in FIG. 3, where a reference numeral 1 designates a loading post, 3 a specimen tape ($\frac{1}{2}$ inch wide), 4 a load (200 g), and 5 a drive motor. Reference numeral 6 designates a resistance strain type strain gauge connected between the specimen tape 3 and the motor 5. The tape 3 is moved by the motor 5 at a speed of 0.5 mm/sec. The aforesaid stiffness $S_{TD}$ is the value measured by use of a stiffness gauge available from Tinus Olsen Testing Machine Co., Inc., Willow Grove, Penn., U.S.A. according to ASTM D 747-70. The stiffness $S_{TD}$ was measured by setting the distance between a clamp and a load plate at 0.14 inch, superposing six $\frac{1}{2}$ inch wide, $\frac{1}{2}$ inch long specimen tapes one upon another, bending the specimen tapes at an angle of 20°, and reading the indication of the stiffness gauge at an ambient temperature of 25° C. and relative humidity of 65% RH. The full-scale bending moment was set at 0.005 inch-lbs.

In order to obtain a thin magnetic tape, it is necessary to minimize the thickness of the substrate thereof. When the overall thickness of the magnetic tape is to be 15.5 $\mu$m or less, a substrate having a thickness within the range of 9 $\mu$m to 11 $\mu$m is used. The substrate is generally made of a polyethylene terephthalate base, preferably exhibiting a high mechanical strength and elasticity. However, the modulus of elasticity of the polyethylene terephthalate base should be limited to an appropriate value because a base of this type having an excessively high modulus of elasticity shrinks greatly with heat and curls undesirably. For example, it is preferable that the polyethylene terephthalate base have an $F_1$ value of about 5.5 kg/mm² both in the width and length directions. A magnetic recording tape which has an overall thickness of 15.5 μm or less and which comprises a back layer made on such a polyethylene terephthalate base exhibits a stiffness $S_{TD}$ of at most 6.0.

In the present invention, a back layer is provided on the non-magnetic layer surface of the magnetic recording medium to minimize the friction coefficient $\mu_B$ of the non-magnetic layer surface. This method has been found to be particularly effective for this purpose, much more so than another, usual method in which a lubricant is applied to the non-magnetic layer surface.

The inventors also studied the relationship between the S/N ratio and the surface characteristics of a back layer exhibiting an extremely small friction coefficient $\mu_B$ of the non-magnetic layer surface in the width direction with respect to the axial direction of the loading post.

In video recording, extremely short recording wavelengths are used, so that the noise level is greatly affected by the surface smoothness of the magnetic layer of the magnetic recording medium. To reduce the noise level, therefore, the magnetic tape should move in the video tape recorder in close contact with the magnetic head, thereby minimizing the space loss in the electromagnetic transducing characteristics due to the space between the magnetic tape and the magnetic head. For this reason, it is desirable that the surface of the magnetic tape be as smooth and flat as possible.

In the studies conducted by the inventors, several magnetic tapes exhibiting different surface smoothness of the back layer were made by adding fine particles (e.g., graphite, $SiO_2$ or the like) to the back layer compositions set forth in Table 1. The process included conventional surface treatment (e.g., calendering) and curing of the magnetic tapes in the roll form. These studies revealed that the surface smoothness of the back layer greatly affects the color S/N ratio and the video S/N ratio, as shown in Table 4 and FIGS. 4 and 5. Particularly, remarkable interrelation was observed between the surface smoothness of the back layer and the color S/N ratio.

Thus it has been found that a surface roughness of the back layer above 0.038 μm sharply reduces the S/N ratio, causing the magnetic tape of generate a high level of noise.

It is considered that the above-mentioned effect of the surface roughness of the back layer occurs because the unevenness of the back layer surface affects the unevenness of the magnetic layer surface during calendering of the magnetic tape and during curing thereof in the roll form. Namely, this effect is presumably attributable to the transferring of the unevenness of the back layer surface the magnetic layer surface. This effect of the surface roughness of the back layer is large particularly when the thickness of the magnetic tape is 15.5 μm or less. Accordingly, for such a thin magnetic tape, the surface roughness of the back layer should be 0.038 μm or less.

In the above studies, the surface roughness of the back layer was measured by use of a stylus type surface texture measuring instrument (SURFCOM 800A available from Tokyo Seimitsu Co., Ltd., in Japan), with the cut-off value set at 0.08 mm.

DETAILED DESCRIPTION OF THE INVENTION

Figure 1:
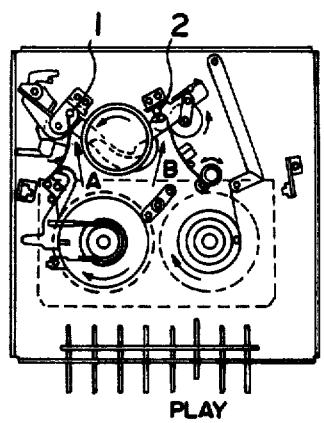
FIG. 1 is a plan view showing a video tape movement system in a video tape recorder.

The magnetic coating composition used to make the magnetic recording medium in accordance with the present invention may be prepared by the methods as disclosed, for example, in Japanese Patent Publication Nos. 35(1960)-15, 39(1964)-26794, 43(1968)-186, 47(1972)-28043, 47(1972)-28045, 47(1972)-28046, 47(1972)-28048, 47(1972)-31445, 48(1973)-11162, 48(1973)-21331 and 48(1973)-33683, and USSR Patent specification No. 308,033. The magnetic coating compositions disclosed in these publication contain, as main constuents, ferromagnetic grains, binders and coating solvents. They may further contain additives such as dispersing agents, lubricants, abrasive materials, and antistatic agents.

In the present invention, it is possible to use ferromagnetic fine grains such as ferromagnetic iron oxide, ferromagnetic chromium dioxide, and ferromagnetic alloy grains.

The ferromagnetic iron oxide which may be used as the ferromagnetic fine grains in the present invention is represented by the general formula $FeO_x$ where x is a value within the range of $1.33 \leq x \leq 1.50$. Examples of such ferromagnetic iron oxide are maghemite ($\gamma$-$Fe_2O_3$, x=1.33), magnetite ($Fe_3O_4$, x=1.50) and Berthollide compounds of these compounds ($FeO_x$, $1.33<x<1.50$). The value x is represented by the formula:

$$x = \frac{1}{2}\{2(\text{atomic \% of bivalent iron}) + 3(\text{atomic \% of trivalent iron})\} \cdot 1/100.$$

The above-described ferromagnetic iron oxide may contain a bivalent metal such as Cr, Mn, Co, Ni, Cu or Zn in a proportion within the range of 0 to 10 atomic % based on the ferromagnetic iron oxide.

The ferromagnetic chromium dioxide ($CrO_2$) which may be used in the present invention may contain metals such as Na, K, Ti, V, Mn, Fe, Co, Ni, Tc, Ru, Sn, Ce and Pb, semiconductors such as P, Sb and Te, or oxides of these metals in a proportion within the range of 0 to 20 wt.%.

The above-mentioned ferromagnetic iron oxide and ferromagnetic chromium dioxide should generally have an acicular ratio within the range of about 2/1 to 20/1, preferably an acicular ratio of 5/1 or higher, and an average grain length within the range of 0.2 μm to 2.0 μm, preferably 0.3 μm to 1.5 μm.

The ferromagnetic alloy grains which may be used as ferromagnetic fine grains in the present invention should have a metal content of 75 wt.% or more, of which 80 wt.% or more should be constituted by at least one ferromagnetic metal (i.e. Fe, Co, Ni, Fe-Co, Fe-Ni, Co-Ni or Co-Ni-Fe). At most 20 wt.% of the metal content, preferably 0.5 to 5 wt.% thereof, may be constituted by Al, Si, S, Sc, Ti, V, Cr, Mn, Cu, Zn, Y, Mo, Rh, Pd, Ag, Sn, Sb, Te, Ba, Ta, W, Re, Au, Hy, Pb, Bi, La, Ce, Pr, Nd, B, P or the like. The ferromagnetic alloy grains may also contain small amounts of water, hydroxides or oxides.

Examples of ferromagnetic fine grains are described, or example, in Japanese Patent Publication Nos. 36(1961)-5515, 37(1962)-4825, 39(1964)-5009, 39(1964)-10307, 44(1969)-14090, 45(1970)-18372, 47(1972)-22062, 47(1972)-22513, 46(1971)-28466, 46(1971)-38755, 47(1972)-4286, 47(1972)-12422, 47(1972)-17284, 47(1972)-18509, 47(1972)-18573, and 48(1973)-39639; U.S. Pat. Nos. 3,026,215, 3,031,341, 3,100,194, 3,242,005, and 3,389,014; British Pat. Nos. 752,659, 782,762, and 1,007,323; French Pat. No. 1,107,654; and West German Offenlegungsschrift No. 1,381,334.

The binder contained in the magnetic coating composition used in the present invention may be a conventional thermoplastic resin, a thermosetting resin, or a reactive resin, or a mixture of two or more of these resins.

The thermoplastic resin which may be used as the binder in the present invention generally has a softening point of 150° C. or lower, an average molecular weight within the range of 10,000 to 200,000, and a polymerization degree within the range of about 200 to 2,000. The thermoplastic resin may, for example, be a vinyl chloride-vinyl acetate copolymer, a vinyl chloride-vinylicene chloride copolymer, a vinyl chloride-acrylonitrile copolymer, an acrylic ester-acrylonitrile copolymer, an acrylic ester-vinylidene chloride copolymer, an acrylic ester-styrene copolymer, a methacrylic ester-acrylonitrile copolymer, a methacrylic ester-vinylidene chloride copolymer, a methacrylic ester-styrene copolymer, a urethane elastomer, a polyvinyl fluoride, a vinylidene chloride-acrylonitrile copolymer, a butadiene-acrylonitrile copolymer, a polyamide resin, a polyvinyl butyral, a cellulose derivative (such as cellulose acetate butyrate, cellulose diacetate, cellulose triacetate, cellulose propionate, or nitrocellulose), a styrene-butadiene copolymer, a polyester resin, an amino resin, a synthetic rubber type thermoplastic resin (such as polybutadiene, polychloroprene, polyisoprene, or styrene-butadiene copolymer), or a mixture of two or more of these compounds.

Examples of the thermoplastic resin of this type are described, for example, in Japanese Patent Publication Nos. 37(1962)-6877, 39(1964)-12528, 39(1964)-19282, 40(1965)-5349, 40(1965)-20907, 41(1966)-9463, 41(1966)-14059, 41(1966)-16985, 42(1967)-6428, 42(1967)-11621, 43(1968)-4623, 43(1968)-15206, 44(1969)-2889, 44(1969)-17947, 44(1969)-18232, 45(1970)-14020, 45(1970)-14500, 47(1972)-18573, 47(1972)-22063, 47(1972)-22064, 47(1972)-22068, 47(1972)-22069, 47(1972)-22070, and 48(1973)-27886; U.S. Pat. Nos. 3,144,352, 3,419,420, 3,499,789 and 3,713,887.

The thermosetting resin or the reactive resin which may be used as the binder in the present invention generally has a molecular weight of 200,000 or less when in the form of coating solution, and exhibits an infinite increase in the molecular weight through the condensation or addition reaction or the like when applied onto the substrate and dried. It is preferable that the resin of this type does not soften or melt before the thermal decomposition. Examples of the resin of this type are a phenol formaldehyde-novolak resin, a phenol formaldehyde-resol resin, a phenol furfural resin, a xylene formaldehyde resin, a urea resin, a melamine resin, a drying oil alkyd resin, an alkyd resin modified with phenolic resin, an alkyd resin modified with maleic resin, an unsaturated polyester resin, a combination of an epoxy resin with a hardener (e.g. polyamine, acid anhydride, polyamide resin or the like), a moisture hardening type terminal isocyanate polyester resin, a moisture hardening type terminal isocyanate polyether resin, a polyisocyanate prepolymer (e.g. a compound having three or more isocyanate groups per molecule and obtained by the reaction of diisocyanate and low molecular weight triol, a trimer or a tetramer of diisocyanate, or the like), a resin containing a polyisocyanate prepolymer and an active hydrogen (e.g. polyester polyol, polyether polyol, acrylic copolymer, maleic copolymer, 2-hydroxyethyl methacrylate copolymer, para-hydroxy styrene copolymer or the like), and a mixture of two or more of these compounds.

Examples of the thermosetting resin or the reactive resin of this type are described, for example, in Japanese Patent Publication Nos. 39(1964)-8103, 40(1965)-9779, 41(1966)-7192, 41(1966)-8016, 41(1966)-14275, 42(1967)-18179, 43(1968)-12081, 44(1969)-28023, 45(1970)-14501, 45(1970)-24902, 46(1971)-13103, 47(1972)-22065, 47(1972)-22066, 47(1972)-22067, 47(1972)-22072, 47(1972)-22073, 47(1972)-28045, 47(1972)-28048, and 47(1972)-28922; and U.S. Pat. Nos. 3,144,353, 3,320,090, 3,437,510, 3,597,273, 3,781,210 and 3,781,211.

The above-mentioned binders may be used alone or as a mixture of two or more thereof. The binders are used in the magnetic coating composition in a proportion within the range of 8 to 150 parts by weight, preferably 10 to 100 parts by weight, particularly 12 to 60 parts by weight, per 100 parts by weight of the ferromagnetic grains.

In addition to the binders and ferromagnetic fine grains, additives such as dispersing agents, lubricants, abrasive materials, and antistatic agents may be added to the magnetic coating composition.

The dispersing agents may, for example, be fatty acids having 12 to 18 carbon atoms ($R_1COOH$, in which $R_1$ designates alkyl or alkenyl group having 11 to 17 carbon atoms) such as caprylic acid, capric acid, lauric acid, myristic acid, palmitic acid, stearic acid, oleic acid, elaidic acid, linoleic acid, linolenic acid and stearolic acid; metallic soaps formed from the above-mentioned fatty acids and alkali metals (Li, Na, K or the like) or alkali earth metals (Mg, Ca, Ba or the like); esters of the above-mentioned fatty acids containing fluorine; amides of the above-mentioned fatty acids; polyalkylene oxide alkyl phosphates; lecithin; and trialkyl polyolefinoxy quaternary ammonium salts (in which alkyl has 1 to 5 carbon atoms, and olefin is ethylene, propylene or the like). It is also possible to use higher alcohols having 12 or more carbon atoms, and sulfates. These dispersing agents are generally used in a proportion within the range of 0.5 to 20 parts by weight per 100 parts by weight of the binders. The dispersing agents are described, for example, in Japanese Patent Publication Nos. 39(1964)-28369, 44(1969)-17945, 48(1973)-7441, 48(1973)-15001, 48(1973)-15002, 48(1973)-16363, and 50(1975)-4121; and U.S. Pat. Nos. 3,387,993 and 3,470,021.

The lubricants may be conductive fine grains such as carbon black, graphite, and carbon black graft polymers; inorganic fine grains such as molybdenum disulfide, and tungsten disulfide; plastic fine grains such as polyethylene, polypropylene, polyethylene-vinyl chloride copolymers, and polytetrafluoroethylene; α-olefin polymers; unsaturated aliphatic hydrocarbons which are liquids at normal temperature (compounds having about 20 carbon atoms, in which an n-olefin double bond is coupled with the terminal carbon atom); and fatty acid esters formed from monobasic fatty acids having 12 to 20 carbon atoms and monohydric alcohols having 3 to 12 carbon atoms. These lubricants are generally used in a proportion within the range of 0.2 to 20 parts by weight per 100 parts by weight of the binders. The lubricants are described, for example, in Japanese Patent Publication Nos. 41(1966)-18064, 43(1968)-23889, 46(1971)-40461, 47(1972)-15621, 47(1972)-18482, 47(1972)-28043, 47(1972)-32001, and 50(1975)-5042; U.S. Pat. Nos. 3,470,021, 3,492,235, 3,497,411, 3,523,086, 3,625,760, 3,630,772 and 3,642,539; "IBM Technical Disclosure Bulletin", Vol. 9, No. 7, Page 779 (December 1966); and "ELEKTRONIK" 1961, No. 12, Page 380.

The abrasive materials may be any of generally used materials such as, for example, fused alumina, silicon carbide, chromium oxide, zircon ($ZrSiO_4$), aluminium phosphate ($AlPO_4$), cerium oxide ($CeO_2$), boron carbide ($B_4C$), aluminium borate ($AlBO_3$), spinel ($MgAl_2O_4$), rutil and anatase (both are represented by $TiO_2$), diaspore (α-AlOOH), corundum, artificial corundum, diamond, artificial diamond, garnet, and emery (main constituents: corundum and magnetite). These abrasive materials preferably have a Mohs hardness of 5 or higher, and an average grain size within the range of 0.05 μm to 5 μm, particularly 0.1 μm to 2 μm. The abrasive materials are generally used in an amount within the range of 0.5 to 20 parts by weight per 100 parts by weight of the binders. They are described, for example, in Japanese Patent Publication Nos. 47(1972)-18572, 48(1973)-15003, 48(1973)-15004 (U.S. Pat. No. 3,617,378), 49(1974)-39402 and 50(1975)-9401; U.S. Pat. Nos. 3,007,807, 3,041,196, 3,293,066, 3,630,910 and 3,687,725; British Pat. No. 1,145,349; West German Pat. (DT-PS) Nos. 853,211 and 1,101,000.

The antistatic agents may, for example be conductive fine grains such as carbon black, graphite and carbon black graft polymers; natural surface active agents such as saponin; nonionic surface active agents such as alkyleneoxide-, glycerin- and glycidol-based surface active agents; cationic surface active agents such as higher alkylamines, quaternary ammonim salts; heterocyclic compounds e.g. pyridine, and phosphonium or sulfonium compounds; anionic surface active agents containing acidic groups such as carboxylic acid, sulfonic acid, phosphoric acid, sulfuric acid ester, and phosphoric acid ester groups; and amphoteric surface active agents such as amino acids, amino sulfonic acids, and sulfates or phosphates of amino alcohols.

The above-mentioned conductive fine grains are generally used in an amount within the range of 0.2 to 20 parts by weight per 100 parts by weight of the binders. The surface active agents are generally used in a proportion within the range of 0.1 to 10 parts by weight per 100 parts by weight of the binders.

Examples of the conductive fine grains and the surface active agents which may be used as the antistatic agents in the present invention are described, for example, in Japanese Patent Publication Nos. 46(1971)-22726, 47(1972)-24881, 47(1972)-26882, 48(1973)-15440 and 48(1973)-26761; U.S. Pat. Nos. 2,271,623, 2,240,472, 2,288,226, 2,676,122, 2,676,924, 2,676,975, 2,691,566, 2,727,860, 2,730,498, 2,742,379, 2,739,891, 3,068,101, 3,158,484, 3,201,253, 3,210,191, 3,249,540, 3,415,649, 3,441,413, 3,442,654, 3,475,174 and 3,545,974; West German Offenlegungsschrift No. 1,942,665; British Pat. Nos. 1,077,317 and 1,198,450; "Synthesis and Applications of Surface Active Agents" by Ryohei Oda, Tsubaki Shoten, 1964; "Surface Active Agents" by A. W. Schwarz & J. W. Perry, Interscience Publication Incorporated, 1958; "Encyclopedia of Surface Active Agents, Vol. 2" by J. P. Sisley, Chemical Publish Company, 1964; and "Surface Active Agent Handbook", sixth edition, Sangyo Tosho K.K., Dec. 20, 1966.

The surface active agents may be used alone or as a mixture of two or more thereof. They may also be used for purposes other than as the antistatic agents, for example, for dispersion, improvement of magnetic characteristics and lubricating properties, and as coating assisting auxiliaries.

Examples of the organic solvents used in the magnetic coating composition in accordance with the present invention are ketones such as acetone, methyl ethyl ketone, methyl isobutyl ketone, and cyclohexanone, alcohols such as methyl alcohol, ethyl alcohol, propyl alcohol, and butyl alcohol; esters such as methyl acetate, ethyl acetate, butyl acetate, ethyl lactate, and glycol acetate monoethyl ether; ethers such as ethyl ether, ethylene glycol dimethyl ether, ethylene glycol monoethyl ether, and dioxane; aromatic hydrocarbons such as benzene, toluene, and xylene; chlorinated hydrocarbons such as methylene chloride, ethylene chloride, carbon tetrachloride, chloroform, ethylene chlorohydrin, and dichlorobenzene, or the like.

The magnetic coating composition used in the present invention is prepared by kneading and dispersing the ferromagnetic metal grains, binder, and coating solvent, and optionally the additives such as dispersing agent, lubricant, abrasive material and antistatic agent.

When the magnetic coating composition is prepared, the constituents thereof may be introduced into a kneader all at once or sequentially. For example, the ferromagnetic metal grains may first be added to a solvent containing a dispersing agent, and kneaded for a predetermined length of time to form a magnetic coating composition.

It is possible to use various types of kneading machines for kneading and dispersing the magnetic coating composition, for example, a twin roll mill, a triple roll mill, a ball mill, a pebble mill, a trommel, a sand grinder, a Szegvari attritor, a high-speed impeller dispersing machine, a high-speed stone mill, a high-speed impact mill, a disperser, a kneader, a high-speed mixer, a homogenizer, an ultrasonic dispersing machine or the like.

The kneading and dispersing techniques are described, for example, in "Paint Flow and Pigment Dispersion" by T. C. Patton, John Wiley & Sons, 1964, and U.S. Pat. Nos. 2,581,414 and 2,855,156.

The substrate used in the present invention may be made of an aromatic polyamide film having a thickness within the range of 2 μm to 12 μm. The surface of the substrate opposite to the magnetic layer surface may be further back coated (i.e. it may be provided with a back layer for the purpose of preventing electrostatic charging, transfer, wow and flutter).

Back coating for such purposes is described, for example, in U.S. Pat. Nos. 2,804,401, 3,293,066, 3,617,378, 3,062,676, 3,734,772, 3,476,596, 2,643,048, 2,803,556, 2,887,462, 2,923,642, 2,997,451, 3,007,892, 3,041,196, 3,115,420, 3,116,688 and 3,761,311.

After being applied onto the substrate in accordance with the present invention, the magnetic layer is generally dried with air flow at a temperature within the range of about 50° to 120° C., preferably 70° to 100° C., particularly 80° to 90° C., depending on the kind of the solvent used in the coating composition. In the drying process, the drying air flow is generally set at about 1 to 5 kl/m², preferably about 2 to 3 kl/m², and the drying time is generally about 30 sec. to 10 min., preferably about 1 to 5 min.

The dried magnetic layer is then preferably subjected to the surface smoothing treatment. This is preferred because, although the curtain coating process can generally form a coating layer having excellent surface smoothness, this process cannot generate a sufficiently high surface smoothness in the case of the magnetic coating composition, and because the magnetic recording layer must have an accurately controlled surface smoothness.

Usually, the surface smoothing treatment is conducted by calendering or by use of a smoothing sheet after drying. In the case of calendering, it is preferable to adopt the supercalendering process in which the magnetic recording medium is passed through a pair of a metal roll and a cotton roll or a synthetic resin (e.g. nylon) roll or the like. The supercalendering process is preferably effected at a roll pressure within the range of about 25 to 100 kg/cm², preferably 30 to 70 kg/cm², at a temperature within the range of about 35° to 100° C., preferably 40° to 80° C., and at a treating speed within the range of 5 to 200 m/min. Temperatures and roll pressures above the above-mentioned ranges adversely affect the magnetic layer and the non-magnetic substrate. Treating speeds below about 5 m/min. cannot provide the surface smoothing effect, and those above about 200 m/min. make it difficult to conduct the treatment.

The surface smoothing treatment is described, for example, in U.S. Pat. Nos. 2,688,567, 2,998,325, and 3,783,023; West German Offenlegungsschrift No. 2,405,222; and Japanese Unexamined Patent Publication Nos. 49(1974)-53631, and 50(1975)-10337.

In the surface smoothing process using a smoothing sheet, the magnetic layer is brought into contact with a flexible sheet and smoothed before it has completely dried and hardened.

A thin magnetic recording tape which has a thickness of 15.5 μm or less and which is provided with a back layer in accordance with the present invention exhibits an extremely improved resistance to tape damage during movement in a video tape recorder. Further, it exhibits a high S/N ratio and excellent characteristics for high-density, short-wavelength recording.

The present invention will further be illustrated by the following nonlimitative examples.

EXAMPLE 1

Magnetic tapes comprising a magnetic layer provided on a substrate made of a polyethylene terephthalate base, and those further comprising a 0.7 μm-thick back layer provided on the non-magnetic layer surface by use of the compositions listed in Table 1 were prepared. These magnetic tapes had a thickness of 15.5 μm or less, different friction coefficients $\mu_B$ of the non-magnetic layer surfaces and different stiffness $S_{TD}$ in the tape width direction. The respective magnetic tape specimens were moved in a video tape recorder to investigate the degree of tape damage.

The characteristics of the specimens used in the test, and the results of the tape damage test were as shown in Table 2. The video tape recorder used in the test was Victor HR 3600 (available from Victor Company of Japan, Limited).

In Table 1, specimen Nos. 1 to 5 had no back layer and exhibited high $\mu_B$ values, while specimen Nos. 6 to 10 had a back layer and exhibited low $\mu_B$ values.

TABLE 1

Compositions of Test Specimens

| Specimen No. | Magnetic layer | Back layer | Base |
|---|---|---|---|
| 1 | ↑ | ↑ | ↑ |
| 2 | ↑ | Without Back layer | Polyethylene terephthalate |
| 3 | Magnetic material 300 parts | | |
| 4 | (Fe₂O₃) | ↓ | |
| 5 | ⎧ Vinyl chloride copolymer | ↓ | ↓ |
| 6 | ⎨ Hydroxyethyl acrylate | 60 parts | ↑ |
| 7 | ⎩ Lauric acid | Nitrocellulose 30 parts | ↓ |
| 8 | Urethane resin 20 parts | Polyurethane resin 15 parts | ↓ |
| 9 | Lecithin 2 parts | Polyisocyanate 25 parts | ↓ |
| 10 | Silicone oil 0.5 parts | CaCO₃ 150 parts | ↓ |
| | ↓ | ↓ | ↓ |

TABLE 2

Results of Tape Damage Test

| Specimen No. | Tape thickness (1 μm) | Back layer | $\mu_B$ | $S_{TD}$ | Tape* damage |
|---|---|---|---|---|---|
| 1 | 14.2 | None | 0.60 | 2.6 | D |
| 2 | 14.4 | " | 0.59 | 3.1 | D |
| 3 | 13.8 | " | 0.55 | 3.1 | D |
| 4 | 15.5 | " | 0.65 | 3.9 | D |
| 5 | 15.5 | " | 0.61 | 5.4 | C |
| 6 | 15.5 | Provided | 0.30 | 3.5 | B |
| 7 | 15.3 | " | 0.30 | 4.3 | B |
| 8 | 15.5 | " | 0.29 | 4.5 | B |
| 9 | 15.5 | " | 0.26 | 5.4 | A |
| 10 | 15.5 | " | 0.28 | 6.0 | A |

*The tape damage column indicates the evaluation of the tape edge folding at the time of unloading.
A: No edge folding
B: Practically permissible slight edge folding
C: Practically unallowable edge folding
D: Practically unusable due to serious edge folding The specimens having no back layer exhibited tape damage of rank D or C because of their high $\mu_B$ values (0.55 to 0.61). Specimen No. 5 exhibited tape damage of rank C because its $S_{TD}$ value was slightly larger than specimen Nos. 1 to 4, which exhibited tape damage of rank D. Specimen Nos. 6 to 10 exhibited tape damage of rank B or A, indicating that the back layers considerably reduced the $\mu_B$ value. Specimen Nos. 9 and 10 exhibited better resistance to tape damage than specimen Nos. 6 to 8 because the former had slightly smaller $\mu_B$ values and larger $S_{TD}$ values than the latter.

EXAMPLE 2

From Example 1, it was found that magnetic tapes exhibiting smaller $\mu_B$ values and larger $S_{TD}$ values were more resistant to tape damage. To further investigate this, various specimen tapes were prepared by use of the magnetic layer compositions and back layer compositions listed in Table 1, and polyethylene terephthalate bases having different Young's moduli of elasticity in the width direction. The characteristics of the specimen tapes and the results of tape damage test were as shown in Table 3. The tape damage test was conducted in the same way as in Example 1.

TABLE 3

| | | Results of Tape Damage Test | | | |
|---|---|---|---|---|---|
| Specimen No. | Tape thickness (1 μm) | Back layer | $\mu_B$ | $S_{TD}$ | Tape* damage |
| 1 | 15.4 | None | 0.81 | 5.2 | D |
| 2 | 15.1 | " | 0.68 | 4.2 | D |
| 3 | 14.7 | " | 0.51 | 2.6 | D |
| 4 | 15.2 | " | 0.51 | 4.4 | C |
| 5 | 15.0 | " | 0.47 | 4.2 | C |
| 6 | 15.0 | " | 0.42 | 3.8 | C |
| 7 | 14.9 | " | 0.44 | 3.6 | C |
| 8 | 15.5 | Provided | 0.57 | 6.0 | B |
| 9 | 15.5 | " | 0.51 | 5.9 | B |
| 10 | 15.3 | " | 0.42 | 4.9 | B |
| 11 | 15.2 | " | 0.34 | 4.2 | B |
| 12 | 15.1 | " | 0.32 | 3.6 | B |
| 13 | 15.1 | " | 0.27 | 3.8 | B |
| 14 | 14.5 | " | 0.24 | 3.0 | B |
| 15 | 14.2 | " | 0.15 | 2.6 | B |
| 16 | 13.9 | " | 0.11 | 1.9 | B |
| 17 | 15.5 | " | 0.36 | 5.8 | A |
| 18 | 15.4 | " | 0.28 | 5.3 | A |
| 19 | 15.3 | " | 0.20 | 4.2 | A |
| 20 | 15.3 | " | 0.15 | 4.2 | A |

*Tape damage was evaluated using the same ranking method as in Table 1.

Figure 2:
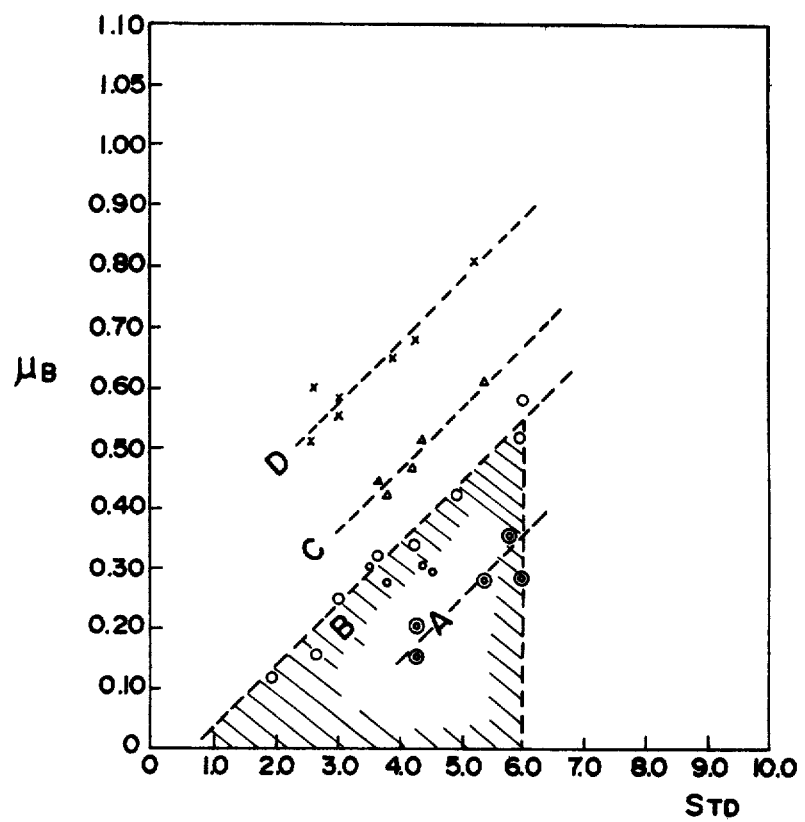
FIG. 2 is a graph showing the relationship between the friction coefficient $\mu_B$ of the non-magnetic layer surface in the width direction with respect to the axial direction of the loading post and the stiffness $S_{TD}$ of the magnetic tape in the width direction, as measured in tape damage tests.
Figure 3:
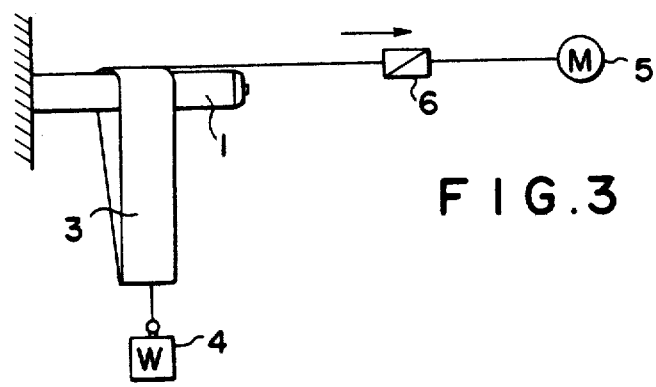
FIG. 3 is a schematic diagram showing a method of measuring the friction coefficient $\mu_B$.

The $\mu_B$ and $S_{TD}$ values listed in Tables 2 and 3 were plotted on the graph shown in FIG. 2. The levels of tape damage determined in the tests are indicated by lines A, B, C and D on the graph. Namely, magnetic tapes exhibiting the $\mu_B$ values smaller than those on the line A correspond to rank A. Magnetic tapes exhibiting the $\mu_B$ values, which are smaller than those on the line B and larger than those on the line A, correspond to rank B. Ranks C and D can be defined in the similar way. The hatched range in the graph of FIG. 2 includes ranks A and B, and magnetic tapes falling within this range exhibit little tape damage and are practically permissible.

The line B is represented by the following formula:

$$\mu_B = 0.1 S_{TD} - 0.05 \quad (S_{TD} \leq 6.0) \quad (0 \leq \mu_B)$$

Accordingly, the hatched range in FIG. 2 indicates the magnetic tapes exhibiting the $\mu_B$ values smaller than those on the line B represented by the above-described formula, namely, those satisfying:

$$\mu_B \leq 0.1 S_{TD} - 0.05 \quad (S_{TD} \geq 6.0)$$

As described above, this range indicates the magnetic tapes exhibiting a high resistance to tape damage.

The above mentioned formula can be represented by the following formula in terms of the $S_{TD}$ range:

$$\frac{\mu_B + 0.05}{0.1} \leq S_{TD} \leq 6.0$$

Of course, in the above formulas, the friction coefficient $\mu_B$ cannot be smaller than zero, namely, $0 \leq \mu_B$.

EXAMPLE 3

In order to investigate the relationships between the surface smoothness of the back layer and the color S/N ratio as well as the video S/N ratio, test specimens having different surface roughness of the back layers were made by using the magnetic layer compositions and the back layer compositions as listed in Table 1, and adding various amounts of graphite grains (grain size: 0.1 μm to 5.0 μm) to the back layer compositions. The process of making the test specimens included the conventional calendering treatment and the curing treatment. The curing treatment was conducted on the test specimens in the roll form. The calendering temperature and the temperature of curing in the tape roll form were 60° to 80° C. The tape specimens exhibited the characteristics shown in Table 4. A polyethylene terephthalate base having a surface roughness of 0.01 μm was used to make the test specimens. The cut-off value in the measurement of the surface roughness was 0.08 mm. The color S/N ratio and the video S/N ratio were measured as described below.

The differences of the S/N ratio of test specimens with respect to that of specimen No. 10 listed in Table 4 were determined by use of a noise meter (925C available from Shibasoku K.K., in Japan). To determine the color S/N ratio, a 10 kHz high-pass filter and a 500 kHz, AM low-pass filter were used. To determine the video S/N ratio, a 10 kHz high-pass filter and a 4 MHz low-pass filter were used. The video tape recorder used in the test was a Matsushita NV-8300.

TABLE 4

| Specimen No. | Tape Thickness | Back layer | (Note 1) Proportion of graphite | (Note 2) Surface roughness of non-magnetic layer | (Note 3) Color S/N | (Note 4) Video S/N | $\mu_B$ | $S_{TD}$ | (Note 5) Tape damage |
|---|---|---|---|---|---|---|---|---|---|
| 1 | 14.2 μm | None | 0 Wt % | 0.012 μm | +1.6 dB | +1.1 dB | 0.60 | 2.6 | D |
| 2 | 14.4 | " | 0 | 0.012 | +1.6 | +1.1 | 0.59 | 3.1 | D |
| 3 | 13.8 | " | 0 | 0.012 | +1.6 | +1.1 | 0.55 | 3.1 | D |
| 4 | 15.5 | " | 0 | 0.012 | +1.6 | +1.1 | 0.65 | 3.9 | D |
| 5 | 15.5 | " | 0 | 0.012 | +1.6 | +1.1 | 0.61 | 5.4 | D |
| 6 | 15.5 | Provided | 0.02 | 0.015 | +1.5 | +0.9 | 0.30 | 3.5 | B |
| 7 | 15.3 | " | 0.05 | 0.020 | +1.3 | +0.7 | 0.30 | 3.6 | B |
| 8 | 15.5 | " | 0.10 | 0.025 | +1.0 | +0.5 | 0.29 | 3.6 | B |
| 9 | 15.5 | " | 0.15 | 0.031 | +0.5 | +0.3 | 0.29 | 3.7 | B |
| 10 | 15.5 | " | 0.20 | 0.038 | Reference | Reference | 0.28 | 3.5 | B |
| 11 | 15.2 | " | 0.25 | 0.044 | −1.2 | −0.5 | 0.30 | 3.6 | B |
| 12 | 15.3 | " | 0.30 | 0.047 | −1.5 | −0.9 | 0.29 | 3.5 | B |
| 13 | 15.4 | " | 0.50 | 0.052 | −2.4 | −1.4 | 0.30 | 3.6 | B |
| 14 | 15.5 | " | 0.70 | 0.066 | −5.3 | −2.8 | 0.29 | 3.5 | B |

TABLE 4-continued

| Specimen No. | Tape Thickness | Back layer | (Note 1) Proportion of graphite | (Note 2) Surface roughness of non-magnetic layer | (Note 3) Color S/N | (Note 4) Video S/N | $\mu_B$ | $S_{TD}$ | (Note 5) Tape damage |
|---|---|---|---|---|---|---|---|---|---|
| 15 | 15.1 | " | 0.90 | 0.087 | −8.8 | −4.7 | 0.29 | 3.7 | B |

Note 1: Percent by weight based on $CaCO_3$ in the back layer composition
Note 2: Values (μm) measured with SURFCOM 800A available from Tokyo Seimitsu Co., Ltd., in Japan
Notes 3 and 4: Difference in the S/N ratio with reference to that of specimen No. 10 (For example, +1.0dB means that the S/N ratio of the specimen is 1.0dB higher than that of the reference tape and has a higher quality.)
Note 5: Tape damage was evaluated using the same ranking method as in Table 1

Figure 4:
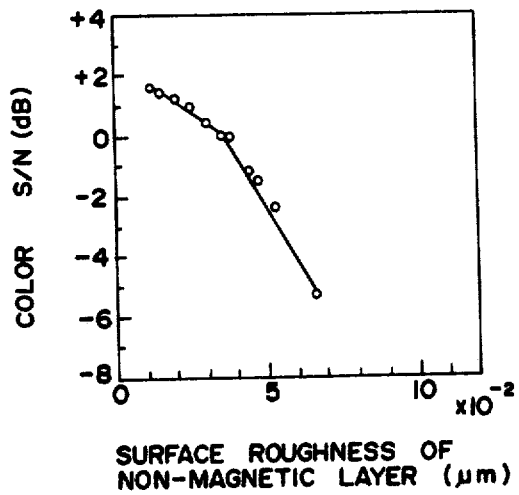
FIG. 4 is a graph showing the relationship between the surface roughness of the non-magnetic layer surface and the color S/N ratio.
Figure 5:
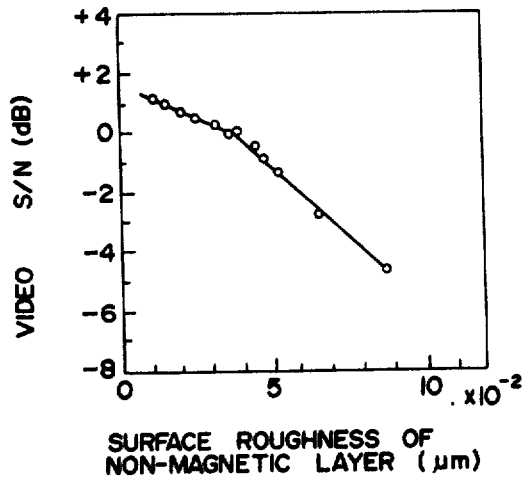
FIG. 5 is a graph showing the relationship between the surface roughness of the non-magnetic layer surface and the video S/N ratio.

The relationships between the surface roughness of the non-magnetic layer surface and the color S/N ratio as well as the video S/N ratio listed in Table 4 are shown in FIGS. 4 and 5, respectively. From FIGS. 4 and 5, it will be found that the color S/N ratio and the video S/N ratio sharply decrease when the surface roughness of the non-magnetic layer surface is above 0.038 μm, and gradually increase when the surface roughness thereof is below 0.038 μm. These results clearly show that, in order to obtain a high-quality thin magnetic tape exhibiting a high S/N ratio, the surface roughness of the non-magnetic layer must be 0.038 μm or less.

We claim:

1. A magnetic recording medium comprising a non-magnetic flexible substrate, a magnetic layer provided on the surface of said substrate and containing ferromagnetic grains dispersed in a binder, and a back layer provided on the back surface of said substrate, wherein the stiffness ($S_{TD}$) of said magnetic recording medium is 6.0 or less, the surface roughness of said back layer is substantially 0.038 microns or less, the magnetic recording medium has a thickness of substantially 15.5 microns or less, and the friction coefficient ($\mu_B$) of said back layer with respect to the axial direction of a loading post satisfies the condition:

$$0 \leq \mu_B \leq 0.1 S_{TD} - 0.05.$$

2. A magnetic recording medium as defined in claim 1 wherein said friction coefficient ($\mu_B$) is 0.30 or less.

3. A magnetic recording medium as defined in claim 1 wherein said ferromagnetic grains are selected from the group consisting of ferromagnetic iron oxide, ferromagnetic chromium dioxide, and ferromagnetic alloy grains.

4. A magnetic recording medium as defined in claim 1 wherein said binder is selected from the group consisting of a thermoplastic resin, a thermosetting or reactive resin, and a mixture of two or more of these resins.

5. A magnetic recording medium as defined in claim 1 wherein said binder is contained in a proportion within the range of 8 to 150 parts by weight per 100 parts by weight of said ferromagnetic grains.

6. A magnetic recording medium as defined in claim 1 wherein said back layer is formed from a composition containing nitrocellulose, a polyurethane resin, a polyisocyanate, and $CaCO_3$.

* * * * *